Sept. 3, 1968 F. KURZWEIL, JR 3,400,382

THERMOPLASTIC RECORDING MEDIUM

Filed May 12, 1965 2 Sheets-Sheet 1

*INVENTOR.*
FRED KURZWEIL, Jr.
*BY* Elmer Galbrait
ATTORNEY

United States Patent Office 3,400,382

Patented Sept. 3, 1968

3,400,382
THERMOPLASTIC RECORDING MEDIUM

Fred Kurzweil, Jr., Saratoga, Calif., assignor to International Business Machines Corporation, Armonk, N.Y., a corporation of New York Filed May 12, 1965, Ser. No. 455,074
8 Claims. (Cl. 340—173)

ABSTRACT OF THE DISCLOSURE

A memory system including a thermoplastic recording medium that has a series of channels formed thereon before information is recorded. The channels are used to guide the electron beam during the information writing operation. The channels are formed by a plurality of electrical conductors that are embedded in the thermoplastic material. The conductors are used to heat the strips of thermoplastic material directly above the conductors. After the thermoplastic material is heated, a uniform charge is deposited on the thermoplastic recording medium. The charge causes channels to be formed above the conductors.

The present invention relates to information storage and more particularly to thermoplastic recording.

Thermoplastic recording systems generally include a memory that has a layer of thermoplastic material over a conductive backing plate. The thermoplastic material has the characteristic of becoming plastic when heated. Information is recorded by depositing a pattern of electrical charges on the surface of the thermoplastic material. The thermoplastic material is then heated and the electrostatic forces created by the charge pattern deform the layer of thermoplastic material. After the thermoplastic material has cooled, a permanent deformation pattern remains that resembles the pattern of the charges that were deposited. The information recorded can be subsequently read by optically or electronically examining the deformation patterns.

In the thermoplastic recording systems shown in the prior art, the layer of thermoplastic material has a flat or smooth surface when the information bearing charge pattern is deposited. The electron beam which deposits the information bearing charge pattern is moved across the surface of the thermoplastic material under "open loop" control, that is, the system that controls the position of the beam does not have any feedback control signal that indicates the location that the beam is actually striking on the surface of the thermoplastic material.

An object of the present invention is to provide an improved thermoplastic memory element.

Another object of the present invention is to provide a thermoplastic memory element which allows closed loop position control of the electron beam used to deposit the information bearing charge pattern on the surface of the thermoplastic material.

A still further object of the present invention is to provide a thermoplastic memory element which includes means for deforming the thermoplastic material in order to facilitate closed loop position control of the electron beam used to deposit the information bearing charge pattern.

Yet another object of the present invention is to provide a thermoplastic recording system wherein both the electron beam used to write information and the electron beam used to read information operate under closed loop control.

Still another object of the present invention is to provide a thermoplastic recording element which includes means for selectively heating segments of the recording element to develop written charge patterns or to erase previously stored information.

Yet another object of the present invention is to provide means for forming predetermined deformation patterns in selected areas of the memory element.

The above objects are achieved by providing a memory element which includes an electrically insulating substrate, a plurality of electrical conductors positioned on said substrate and a layer of thermoplastic material covering said conductors. Before the information bearing charge pattern is deposited on the memory element, a uniform charge pattern is deposited on the surface of the thermoplastic material and then the thermoplastic material is heated. When heated, the thermoplastic material becomes plastic and the electrostatic forces between the uniform charge pattern and the plurality of conductors form grooves on the surface of the thermoplastic material above each of the conductors. The thermoplastic material is then cooled to return it to the solid state. The grooves are then used as guides for the electron beam that deposits the information bearing charge pattern on the surface of the thermoplastic material. After the information bearing charge pattern is deposited, the thermoplastic is again heated and the information bearing charge pattern forms information bearing indentations in the previously formed grooves.

The conductors can also be used to selectively heat particular areas of the thermoplastic recording element. Furthermore, by varying the shape of the conductors, information bearing deformations can be formed by the first heating operation. These deformations can be used to index the electron beam to selected areas of the memory element.

The foregoing and other objects, features and advantages of the invention will be apparent from the following more particular description of preferred embodiments of the invention.

Figure 1:
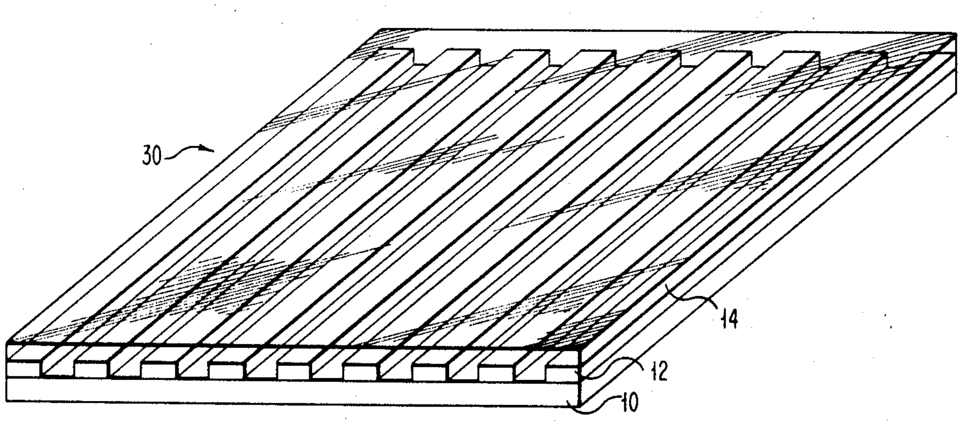
FIG. 1 is a perspective view of a portion of a memory element built in accordance with the present invention.
Figure 2:
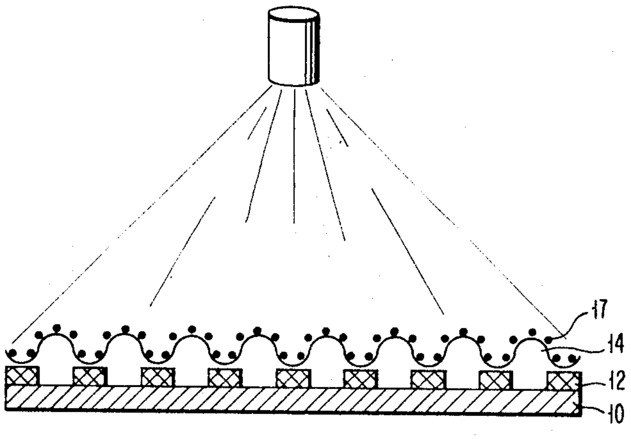
FIG. 2 shows the deformation of the thermoplastic material effected by a uniform charge pattern.

A perspective view of a memory element built in accordance with the present invention is shown in FIG. 1. The memory element includes an insulating substrate 10, a plurality of conductors 12 and a layer of thermoplastic material 14. FIG. 2 shows what occurs after a uniform layer of charge 17 is deposited on the surface of the thermoplastic material 14 and the thermoplastic material is heated. The heat changes layer 14 to a plastic state and the electrostatic forces between the electric charges 17 and their image charges in the conductors 12 form grooves in layer 14. Once the grooves have been formed, the thermoplastic material 14 is cooled thereby solidifying the thermoplastic in the deformed state. As will be explained in detail later, the channels or grooves formed in layer 14 are used to control the position of the electron beam during the information writing operation. The charge 17 gradually dissipates due to leakage through layer 14. The time that charge 17 remains on the surface of layer 14 and, hence, the amount of time available for development (i.e., the time available to heat layer 14 in order to form the deformation) can be controlled by controlling the conductivity of layer 14. For example, if small particles of a conductive material such as carbon are mixed with material 14, the charge will dissipate more quickly.

The backing plate 10 consists of a layer of glass and conductors 12 consist of NESA metal. Conductors 12 are formed by first depositing a uniform layer of NESA material over glass 10 and by then etching away the material in the spaces between the conductors.

The memory element 30 shown in FIGURES 1 and 2 is highly enlarged for the purposes of illustration. Furthermore, only a portion of memory element is shown. One of the advantages of thermoplastic recording is the high storage density that can be achieved. With conventional etching techniques, it is possible to etch up to one thousand conductors per inch. Thus, if desired the channels on memory element 30 could be spaced approximately one thousandth of an inch apart. Using more sophisticated etching techniques, even higher densities can be obtained.

Figure 3:
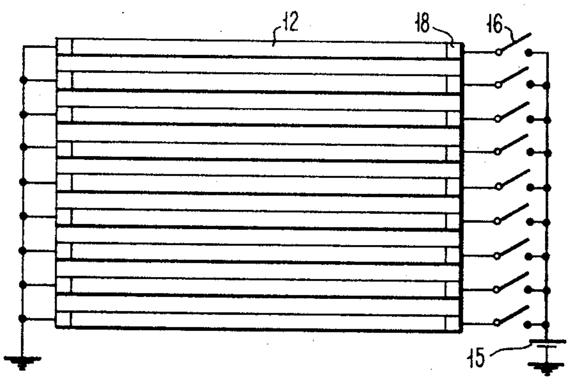
FIG. 3 is a schematic diagram showing electrical connection to the recording element.

FIG. 3 shows another feature of the present invention. As shown in FIG. 3, each of the conductors 12 is connected to a voltage supply 15 through a separate switch 16. When any one of the switches 16 is closed, current flows through the associated conductor 12 thereby generating heat which changes the thermoplastic material above the particular conductor into the plastic state. This will erase any information that had been previously stored on that portion of the thermoplastic material. If sufficient current is applied (i.e., if the thermoplastic is heated sufficiently), the entire channel will be obliterated. With a selective erasing type of circuit such as that shown in FIG. 3, the conductors and the grooves must be spaced sufficiently far apart so that adjacent grooves are not affected when the thermoplastic above one conductor is heated to the plastic state.

Instead of providing a separate switch for each conductor, a block of conductors can be connected to the voltage source through a single switch; thus, an entire area can be heated simultaneously. This would, to some extent, diminish the interaction problem. Interaction can further be diminished by providing spacing between areas that are connected to one switch. Thus, if one hundred conductors are connected to the voltage source through one switch, there should be substantial spacing between these one hundred conductors and the next set of conductors in order to prevent interaction.

One can also connect all of the conductors to a single switch and use resistance heating to heat the entire element in order to erase the information stored anywhere on the memory element. The resistance heating achieved by passing current through the conductors can also be used to provide the heat needed during the first stage of the recording operation during which the channels (as shown in FIG. 2) are formed. Naturally, other types of heating systems such as a separate layer of conductive heating elements below the substrate, infrared radiation, and induction heating could also be used to change the thermoplastic material to its plastic state as needed. FIG. 3 also shows a copper coating 18 on each end of each conductor 12. This copper coating facilitates making electrical connections to conductors 12.

Figure 4:
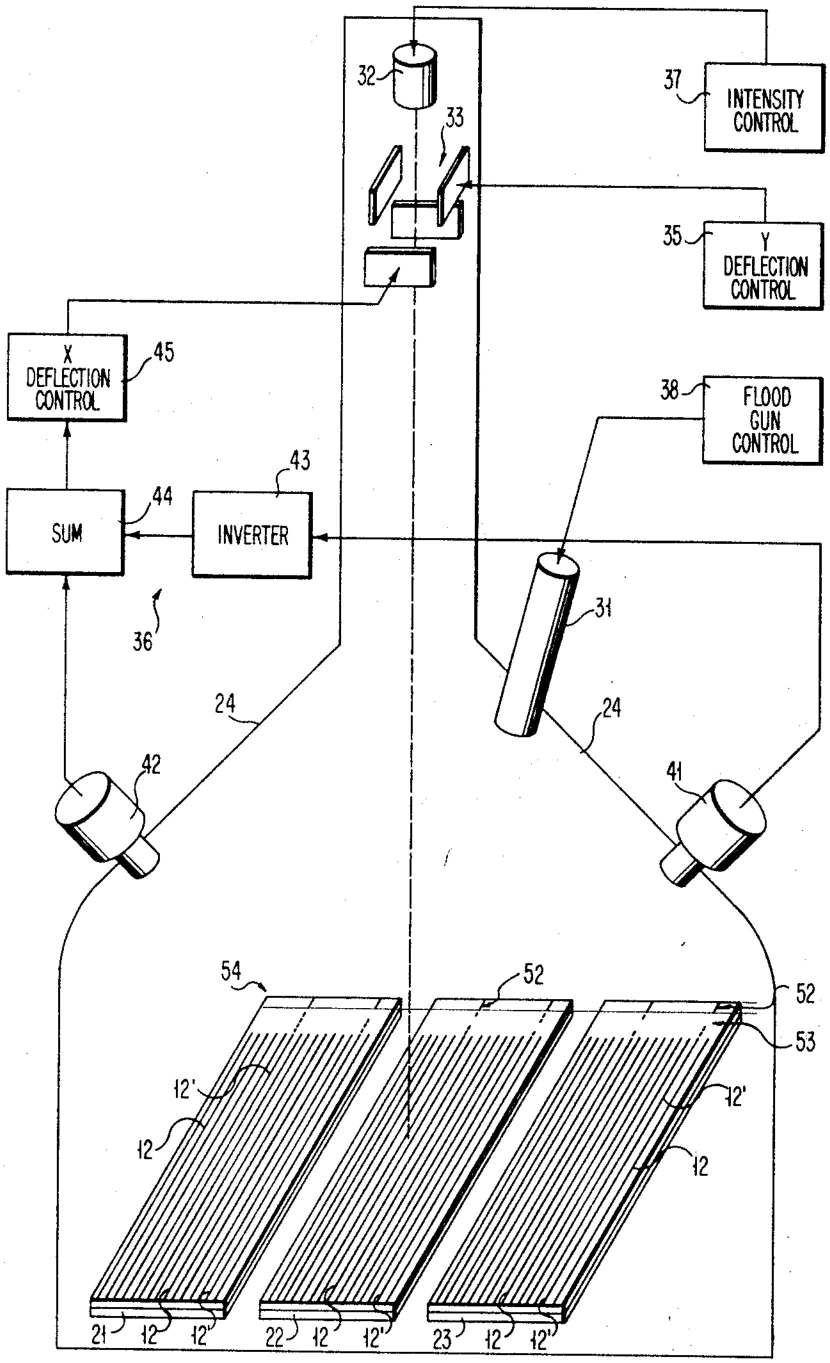
FIG. 4 is a diagram of a system that includes the present invention.

An information storage system that includes the present invention is shown in FIG. 4. This system includes three memory elements 21, 22 and 23, two electron guns 31 and 32, deflection plates 33, a *y*-deflection control circuit, 35, *x*-position control circuitry 36, an intensity control circuit 37 and flood gun control circuitry 38. The electron guns 31 and 32, the deflection plates 33 and the memory elements 21, 22 and 23 are located in a vacuum chamber 24. The present invention is mainly concerned with memory elements 21, 22 and 23 and *x*-position control circuitry 36. Circuitry 36 includes two electron detectors 41 and 42, an inverting circuit 43, a summing circuit 44 and a deflection control circuit 45. Each of the memory elements 21, 22 and 23 have a plurality of conductors 12. The detectors 41 and 42 are positioned orthogonally (at right angles) with respect to conductors 12 and hence, they are positioned orthogonally with respect to the channels on the surface of the thermoplastic material. When an electron beam strikes the side of one of the channels on the surface of the thermoplastic, the majority of the secondary electrons that are emitted travel in a direction perpendicular to the wall of the channel. Hence, if the electron beam strikes the right side of a channel, more electrons reach detector 42 than reach detector 41 and if the electron beam strikes the left side of the channel, more electrons reach detector 41 than reach detector 42. In FIG. 4 the size of elements 21, 22 and 23 is exaggerated in order to show the details of the conductors 12. Actually, the size of the three memory elements is approximately two inches by two inches and the face of each detector 41 and 42 is about the same size.

The system is operated as follows: First, grooves are formed on recording element 30 by covering the surface with a uniform charge using flood gun 31 under control of circuitry 38 and by then heating the thermoplastic material to change it to a plastic state. The electrostatic forces due to the uniform charge pattern form a channel above each conductor, as previously explained. After the channels are formed, the thermoplastic is cooled and the uniform charge pattern is dissipated. Next, the information bearing charge pattern is deposited in the following manner. The information which is to be stored is used to control the intensity of the electron beam through intensity control circuit 37. The *y*-deflection control circuit 35 moves the electron beam in a *y*-direction along the various grooves. The *x*-position of the electron beam is controlled by circuitry 36. Circuitry 36 compares outputs of detectors 41 and 42. If the electron beam strays away from the center of a channel, the output of one of the detectors 41 or 42 increases and the output of the other detector 41 or 42 decreases. Circuits 43 and 44 compare the output of circuits 41 and 42 and a signal is applied to circuit 45 to indicate which direction the electron beam should be moved to return it to the center of the track. Thus, the *x*-position of the electron beam is controlled in a feedback manner during the time that the information bearing charge pattern is deposited. After the information bearing charge pattern is deposited, the thermoplastic is again heated and the electrostatic forces deform the channels. After the thermoplastic is cooled, these deformations can be read using a constant intensity electron beam to sense the deformation. For example, the output of a third detector (not shown) positioned at right angles to detectors 41 and 42 can be used to give an information bearing signal as an electron beam scans a track that has information recorded therein. Alternatively, capacitive coupling techniques could be used to detect the number of backscattered electrons and, hence, to detect the deformations on the surface. Conventional optical techniques for sensing the deformations could also be used.

Another feature of the present invention is shown in FIG. 4. This additional feature provides means for indexing the electron beam. A large system may contain many thousand tracks or channels. Unless an extremely delicate electronic mechanism is provided for positioning the electron beam, it is difficult to know exactly which track is being addressed. By encoding a small segment at the end of each track or at the end of selectively positioned tracks, one can determine positively which track is being addressed by the electron beam. These encoded tracks can be used for indexing the electron beam in a positive manner.

In the previously described embodiments of the invention, each conductor 12 is continuous. In the embodiment shown in FIG. 4, each of the memory elements 21, 22 and 23 has two conductors designated 12′ that are extended beyond the other conductors. The extended portion of each of these conductors has a solid portion 52 and an intermittent portion 53.

When a uniform charge pattern is deposited on the thermoplastic material covering conductors 12′ and the thermoplastic material is heated, a channel is formed above sections 52 and 53; however, the channel above portion 53 of conductors 12' is intermittent. Once the thermoplastic material has solidified, the discontinuities in the channels above portion 53 of conductors 12' can be read similar to the manner that other deformations on the surface of thermoplastic material are detected. Thus, the present invention provides a technique for encoding information into the thermoplastic material.

This encoded information can be useful in positioning the electron beam either during the writing operation or during a reading operation. For example, the beam could always be started from a particular point such as the point designated 54. In moving to any particular channel, the beam can be moved across portion 52 of each of the channels formed by conductors 12'. The number of backscattered electrons gives an indication of when a channel is crossed. The number of channels crossed can be used as an indication of the position of the beam. Next, the beam can be moved along section 53 of one of the conductors 12'. Each conductor 12' would have a distinctive pattern of discontinuities in section 53; hence, by scanning section 53 of any conductor with constant intensity beam and detecting backscattered electrons, the channel being scanned can be determined.

As shown herein, a separate electron gun 31 is used to provide the uniform charge pattern needed to form the channels as shown in FIG. 2. Naturally, a single electron gun that is properly controlled could be used to deposit both the information bearing charge pattern and the uniform charge pattern. Furhermore, as shown herein, two detectors 41 and 42 positioned orthogonal to the channels are used to detect the position of the electron beam relative to the channels. Other schemes for positioning the electron beam relative to the channels could also be used.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. A system for storing information comprising:

a memory element which includes a layer of thermoplastic material covering a plurality of conductors, whereby when a uniform pattern of charge is deposited on said thermoplastic material and said thermoplastic material is heated, a plurality of uniform channels are formed on the surface of said thermoplastic material above said conductors;

means for writing information on said memory element comprising: means for generating an electron beam the intensity of which is modulated by said information, a plurality of detectors to detect backscattered electrons; comparing means for comparing the output of said detectors to determine whether said electron beam is in the center of a channel, and means for controlling the position of said electron beam in a direction orthogonal to said channels in accordance with the output of said comparing means, whereby the position of said electron beam in a direction orthogonal to said channels is under feedback control.

2. A system for storing information comprising:

a memory element which includes a plurality of electrical conductors covered by a layer of thermoplastic material;

means for depositing a uniform charge on the surface of said layer of thermoplastic material;

means for heating said thermoplastic material;

whereby when a uniform pattern of charge is deposited on said thermoplastic material and said thermoplastic material is heated a plurality of uniform channels are formed on the surface of said thermoplastic material above said conductors;

means for depositing an information bearing charge pattern on the surface of said thermoplastic material after said channels have been formed comprising: means for generating an electron beam, the intensity of which is modulated by said information, a plurality of detectors to detect backscattered electrons, comparing means for comparing the output of said detectors to determine whether said electron beam is in the center of a channel, and means for controlling the position of said electron beam in a direction orthogonal to said channels in accordance with the output of said comparing means, whereby the position of said electron beam in a direction orthogonal to said channels is under feedback control.

3. A memory system comprising:

an electrically insulating substrate;

a plurality of conductors on said electrically insulating substrate;

a layer of thermoplastic material covering said conductor;

means for depositing a uniform pattern of charge of the surface of said thermoplastic material;

means for passing electrical current through said conductors to heat said thermoplastic material;

whereby a plurality of uniform channels are formed on the surface of said thermoplastic material;

means for depositing an information bearing charge pattern on the surface of said thermoplastic material, said means including means for detecting backscattered electrons, whereby the position of said electron beam can be held in the center of said channels by feedback control.

4. A system for storing information comprising:

an electrically insulating substrate;

a plurality of conductors on said electrically insulating substrate;

a layer of thermoplastic material covering said conductor;

means for depositing a uniform pattern of charge on the surface of said thermoplastic material;

means for heating said thermoplastic material, whereby a plurality of uniform channels are formed on the surface of said thermoplastic material.

5. A system for storing information comprising:

a memory element which includes a layer of thermoplastic material covering a plurality of conductors, whereby when a uniform pattern of charge is deposited on said thermoplastic material and said thermoplastic material is heated a plurality of uniform channels are formed on the surface of said thermoplastic material above said conductors;

means for writing information on said memory element comprising: means for generating an electron beam the intensity of which is modulated by said information, detecting means for detecting backscattered electrons to determine whether said electron beam is in the center of a channel, and means for controlling the position of said electron beam in a direction orthogonal to said channels in accordance with the output of said detecting means, whereby the position of said electron beam in a direction orthogonal to said channels is under feedback control.

6. A system for storing information comprising:

an electrically insulating substrate;

a plurality of electrical conductors positioned on said substrate, and a layer of thermoplastic material covering said electrical conductors;

means for depositing a uniform charge pattern on said layer of thermoplastic material, whereby a uniform groove is formed on top of each conductor when a uniform charge pattern is deposited on said thermoplastic material and the thermoplastic material is changed to its plastic state.

7. A system for storing information comprising:

an electrically insulating substrate;

a plurality of electrical conductors positioned on said substrate, and a layer of thermoplastic material covering said electrical conductors;

means for depositing a uniform charge pattern on said layer of thermoplastic material;

means for heating said thermoplastic material in order to change said material to the plastic state, whereby a uniform groove is formed on top of each conductor when a uniform charge pattern is deposited on said thermoplastic material and the thermoplastic material is heated.

8. A thermoplastic memory element comprising:

a glass substrate;

a plurality of strips of metal positioned on said substrate, selected strips having intermittent portions, and a layer of thermoplastic material covering said metal, whereby a uniform groove is formed above each metal strip when a uniform charge pattern is deposited on said thermoplastic material and the thermoplastic material is changed to its plastic state, said intermittent portions forming a coded readable deformation pattern.

References Cited

UNITED STATES PATENTS

| | | | |
|---|---|---|---|
| 3,168,726 | 2/1965 | Boblett | 340—173 |
| 3,196,012 | 7/1965 | Clark | 340—173 |
| 3,222,680 | 12/1965 | Banning et al. | 346—74 |
| 3,333,254 | 7/1967 | Wallace | 240—173 |

BERNARD KONICK, *Primary Examiner.*

J. F. BREIMAYER, *Assistant Examiner.*